United States Patent [19]
Ohtaki

[11] Patent Number: 5,701,210
[45] Date of Patent: Dec. 23, 1997

[54] ACHROMATIC OPTICAL SYSTEM FOR BEAM TRANSFORMATION AND OPTICAL DISK APPARATUS USING THE SAME

[75] Inventor: Katsura Ohtaki, Tokyo, Japan

[73] Assignee: Nikon Corporation, Tokyo, Japan

[21] Appl. No.: 330,112

[22] Filed: Oct. 27, 1994

Related U.S. Application Data

[63] Continuation of Ser. No. 163,594, Dec. 7, 1993, abandoned, which is a continuation of Ser. No. 20,864, Feb. 19, 1993, abandoned, which is a continuation of Ser. No. 871,566, Apr. 17, 1992, abandoned, which is a continuation of Ser. No. 701,181, May 16, 1991, abandoned.

[30] Foreign Application Priority Data

May 18, 1990 [JP] Japan ................................. 2-126912

[51] Int. Cl.⁶ .............................. G02B 5/04; G02B 7/18; G02B 5/06; G02B 13/10
[52] U.S. Cl. ..................... 359/831; 359/832; 359/615; 359/478; 359/669
[58] Field of Search ..................... 359/837, 669, 359/615, 831, 832, 478; 369/112, 121, 122

[56] References Cited

U.S. PATENT DOCUMENTS

| | | | |
|---|---|---|---|
| 4,333,173 | 6/1982 | Yonezawa et al. | 369/122 |
| 4,597,634 | 7/1986 | Steenblik | 359/615 |
| 4,619,508 | 10/1986 | Shibuya et al. | 353/122 |
| 4,750,819 | 6/1988 | Sugiki | 359/669 |
| 4,770,507 | 9/1988 | Arimoto et al. | 359/837 |
| 4,830,483 | 5/1989 | Kohayakawa et al. | 351/221 |
| 4,873,440 | 10/1989 | Mori et al. | 250/327.2 |
| 5,013,136 | 5/1991 | Whitehead et al. | 350/286 |
| 5,016,237 | 5/1991 | Nakamura et al. | 369/112 |

FOREIGN PATENT DOCUMENTS

| | | | |
|---|---|---|---|
| 209418 | 9/1986 | Japan | 359/837 |

*Primary Examiner*—Paul M. Dzierzynski
*Assistant Examiner*—Mohammed Y. Sikder
*Attorney, Agent, or Firm*—Michael N. Meller

[57] ABSTRACT

An achromatic optical system for beam transformation is used for example with the optical head of an optical disk apparatus. This optical system is arranged in an optical path which is traversed by a beam emitted from a light source to reach a surface to be irradiated. This optical system includes a first prism arranged on the side of the light source and a second prism arranged on the side of the surface to be irradiated. The first and second prisms are constructed in such a manner that each of the prisms has a beam incident angle which is greater than its beam exit angle so as to expand the width of a beam passed therethrough and that with respect to a plurality of transmitted beams of different wavelengths the deviation angle of the beam passed through the optical system on the whole (the angle formed by the incident beam on the first prism and the emerging beam from the second prism) becomes the same for each other.

28 Claims, 2 Drawing Sheets

ACHROMATIC OPTICAL SYSTEM FOR BEAM TRANSFORMATION AND OPTICAL DISK APPARATUS USING THE SAME

This application is a continuation of application Ser. No. 08/163,594, filed Dec. 7, 1993 (now abandoned), which is a continuation of Ser. No. 08/020,864, filed Feb. 19, 1993 (now abandoned), which is a continuation of Ser. No. 07/871,566 filed Apr. 17, 1992 (now abandoned), which is a continuation of Ser. No. 07/701,181 filed May 16, 1991 (now abandoned).

BACKGROUND OF THE INVENTION

1. [Field of the Invention]

The present invention relates to an optical system for beam transformation which is used for example with the optical head or the like of disk apparatus and it also relates to an optical disk apparatus using such optical system.

2. [Description of the Prior Art]

The recent progress in the field of optical information recording and reproducing systems has been so marked that various recording media including read only-type optical disks such as compact disks, DRAW (direct read after write)-type optical disks and erasable-type magneto-optical disks. While, in apparatus of the type used for the recording and reproduction of such disk, a small and light-weight semiconductor laser has been generally used as a light source for recording and reproducing purposes, the beam emitted from the semiconductor laser has an elliptic cross-sectional shape due to the laminated structure of the semiconductor laser and therefore the beam must be transformed into a circular shape in order to improve the utilization efficiency of the beam. Particularly, in the case of a recording and reproducing apparatus well suited to the DRAW-type optical disk and the erazable-type magneto-optical disk, it has been said that a considerable beam power is required and hence the use of a beam transformation optical system is indispensable.

In the case of the beam transformation optical system used with the optical head of a conventional optical disk apparatus, however, there is the disadvantage that the S/N ratio is unavoidably deteriorated by variation of the beam wavelength due to the presence of a chromatic aberration as will be described hereunder.

In other words, firstly, during the recording of information the position of the beam spot on the disk is deviated by a wavelength variation (several nm) due to a power output variation of the beam emitted from the semiconductor laser. As a result, it is impossible to form clear record pits at the given positions of the recording tracks, thus causing deterioration of the S/N ratio of the recording and reproducing apparatus.

Also, the following inconveniences are encountered during the reproduction of the information. In other words, the wavelength of the beam emitted from the semiconductor laser is varied in a stepwise manner due to the effects of the temperature and the return light (mode hopping) and therefore it is a general practice to flash the semiconductor laser on and off at a rapid frequency (e.g., up to 500 MHz) (the high frequency superposition method) in order to reduce such mode hop noise. In this case, the semiconductor laser is oscillated in a multi-mode so that the wavelength region is widened (±5~10 nm), though the mode hop noise is reduced. As a result, the beam spot on the disk surface is increased in diameter so that not only the resolving power of the pits is deteriorated but also the S/N ratio is deteriorated during the reproduction of the information.

SUMMARY OF THE INVENTION

The present invention has been made in view of these circumstances and it is the primary object of the invention to provide an achromatic optical system for beam transformation which is capable of expanding the width of a beam to reshape the beam cross-sectional shape and in which the chromatic aberration is compensated with a high degree of accuracy and an optical disk apparatus using such achromatic optical system.

In accordance with one aspect of the present invention, there is thus provided an achromatic optical system for beam transformation including first and second prisms which are arranged in the optical path of the beam emitted from a light source and directed to a surface to be irradiated whereby the first prism arranged on the light source side is so constructed that the incident angle of the beam entering the first prism from the light source is greater than the exit angle of the beam emerging from the first prism thereby expanding the width of the beam passed through the first prism, and the second prism arranged on the side of the surface to be irradiated is constructed in such a manner that the incident angle of the beam incident on the second prism from the first prism is greater than the exit angle of the beam emerging from the second prism thereby expanding the width of the beam passed through the second prism. In addition, the first and second prisms are constructed to substantially satisfy the condition determined by the following equation $$\frac{\delta n_1}{\delta n_2} = m_2 \frac{\cos\left[\theta_2 + \sin^{-1}\left(\frac{1}{n_2}\sin\phi_2\right)\right] \cdot \cos\phi_2}{\cos\left[\theta_1 + \sin^{-1}\left(\frac{1}{n_1}\sin\phi_1\right)\right] \cdot \cos\phi_1} \cdot \frac{\sin\theta_2}{\sin\theta_1}$$

where $n_1$ = the refractive index of the first prism $n_2$ = the refractive index of the second prism $\delta n_1$ = the dispersion of the first prism $\delta n_2$ = the dispersion of the second prism $\theta_1$ = the vertical angle of the first prism $\theta_2$ = the vertical angle of the second prism $\phi_1$ = the exit angle of the beam from the first prism $\phi_2$ = the exit angle of the beam from the second prism $m_2$ = the magnification of the beam by the second prism.

At this time, the first and second prisms should preferably be constructed such that the first and second prisms differ in dispersion from each other.

Also, in accordance with the present invention the first and second prisms may be constructed so as to satisfy the following equation and thereby to accomplish the above mentioned object.

$$0 \leq \frac{\left|\frac{\delta n_1}{\delta n_2} - R\right|}{\frac{\delta n_2}{\delta n_1} + R} < 0.15$$

where the above-mentioned R is given as follows $$R = m_2 \frac{\frac{\sin\theta_2}{\cos\left[\theta_2 + \sin^{-1}\left(\frac{1}{n_2}\sin\phi_2\right)\right]\cdot\cos\phi_2}}{\frac{\sin\theta_1}{\cos\left[\theta_1 + \sin^{-1}\left(\frac{1}{n_1}\sin\phi_1\right)\right]\cdot\cos\phi_1}}$$

In accordance with the present invention the first and second prisms arranged between the light source and the surface to be irradiated are constructed so as to satisfy the previously mentioned specific equation and particularly the dispersion of the first prism on the light source side is selected greater than the dispersion of the second prism on the side of the surface to be irradiated, thereby ensuring the effect of compensating the chromatic aberration of the beam transformation optical system with a high degree of accuracy.

By incorporating such achromatic optical system for beam transformation in the recording and/or reproducing optical head of an optical disk apparatus, for example, it is possible to reduce to a very small value than previously the amount of deviation of the beam spot on the optical disk surface due to a wavelength variation of the laser beam from the light source, with the result that it is possible to intend to improve the recording/reproducing S/N of the apparatus and thereby to effect more accurate recording and reproduction of information.

The above and other objects, features and advantages of the present invention will become more apparent from the following description of preferred embodiments taken in conjunction with the accompanying drawings.

DESCRIPTION OF THE PREFERRED EMBODIMENTS

Figure 1:
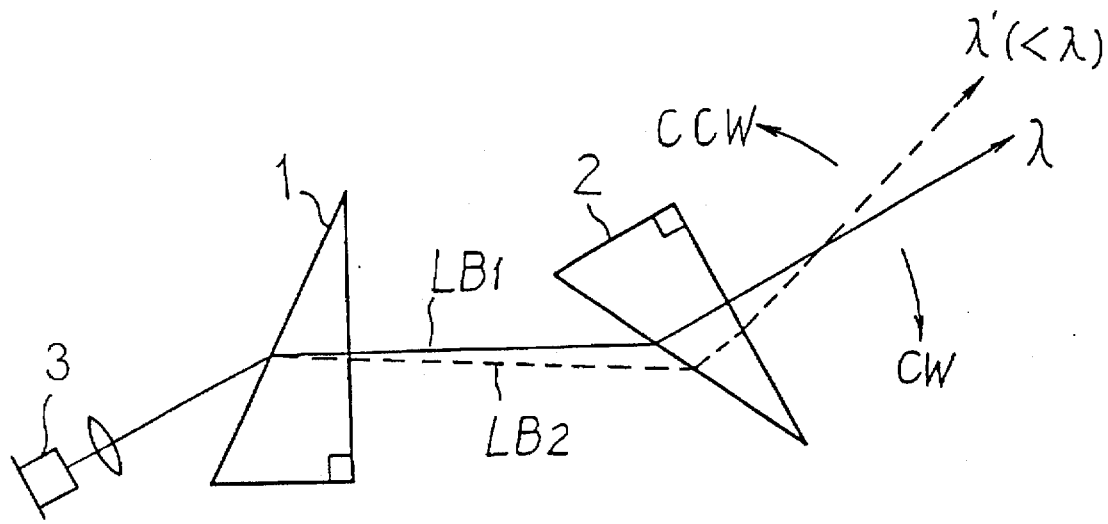
FIG. 1 is a schematic diagram showing the basic construction of a principal part of an achromatic optical system for beam transformation according to an embodiment of the present invention.
Figure 2:
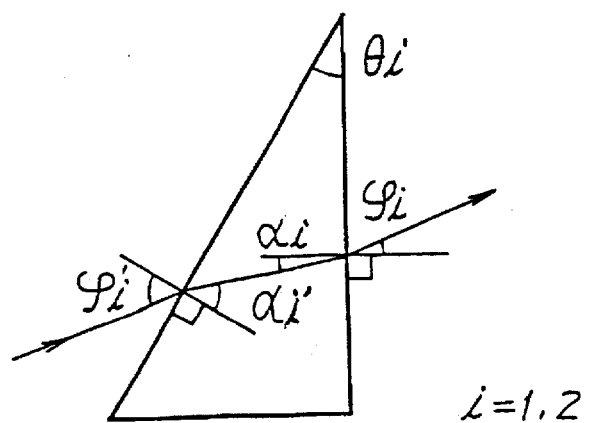
FIG. 2 is a schematic diagram showing the optical path in a prism for explaining the operation of the chromatic aberration compensation according to the present invention.

Referring to FIGS. 1 and 2, the chromatic aberration compensation in an achromatic optical system for beam transformation according to an embodiment of the present invention will now be described.

Referring first to FIG. 1, the beam from a light source 3 composed for example of a semiconductor laser is passed through a first prism 1 and a second prism 2 in this order to form a spot on a surface to be irradiated such as an optical disk which is not shown. The first and second prisms 1 and 2 are arranged between the light source 3 and the surface to be irradiated and this arrangement is one tending to satisfy a condition whereby when the beam passes through each of the prisms, the incident angle of the beam becomes greater than the exit angle of the beam, that is, the beam width (diameter) is expanded. Thus, these prisms 1 and 2 from an optical system for beam transformation. In this case, if λ represents the central wavelength of the beam emitted from the light source and λ' represents a wavelength shorter than the former, the beam of the shorter wavelength has a greater refractive index in the prism so that a beam $LB_2$ of the wavelength λ' is bent by the first prism 1 in the clockwise direction CW of FIG. 1 more than a beam $LB_1$ of the wavelength λ and it is also bent in the counterclockwise direction CCW by the second prism 2 more than the beam $LB_1$.

Thus, in order to compensate the chromatic aberration, it is only necessary to construct the prisms 1 and 2 in such a manner that after the beams $LB_1$ and $LB_2$ of the different wavelengths have been successively transmitted through the first and second prisms 1 and 2, the two beams become equal to each other in terms of the deviation angle (the angle formed by the incident beam on the first prism 1 and the emerging beam from the second prism 2) of the optical system on the whole.

Specific achromatic conditions will now be described with reference to FIG. 2.

Assuming now that with respect to the first and second prisms 1 and 2 shown in FIG. 1, their refractive indices are respectively represented by $n_1$ and $n_2$, dispersions by $\delta n_1$ and $\delta n_2$ ($\delta n_1 = -dn_1/d\lambda$, $\delta n_2 = -dn_2/d\lambda$), prism vertical angles by $\theta_1$ and $\theta_2$, magnifications by $m_1$ and $m_2$ (the beam transformation ratio=$m_1 \cdot m_2$), incident angles (the angle formed by the normal at incident point and the incident ray axis of each of the prisms) by $\phi_1'$ and $\phi_2'$, exit angles (the angle formed by the normal at exit point and the exit ray axis of each of the prisms) by $\phi_1$ and $\phi_2$, the angles of refraction of the entrance surfaces (the angle formed by the normal at incident point and the light ray refracted at the incident plane of each of the prisms) by $\alpha_1'$ and $\alpha_2'$, and incident angles of the refracted rays incident on the exit surfaces (the angle formed by the normal at incident point and the refracted ray incident on the exit surface of each of the prisms) by $\alpha_1$ and $\alpha_2$, the variation of the deviation angle per nm of wavelength variation (chromatic aberration) $\epsilon$ [rad·nm$^{-1}$] is given as follows $$\epsilon = f(\phi_2; n_2, \theta_2) \cdot \delta n_2 - (1/m_2) \cdot f(\phi_1; n_1, \theta_1) \cdot \delta n_1 \qquad (1)$$

where $$f(\phi_i; n_i, \theta_i) = \frac{\sin\theta_i}{\cos\alpha_i' \cdot \cos\phi_i} \qquad (\text{where } i = 1,2) \qquad (2)$$

$$m_2 = \frac{\cos\phi_2 \cdot \cos\alpha_2'}{\cos\phi_2' \cdot \cos\alpha_2} \qquad (3)$$

and also the following equations hold in accordance with the law of refraction and the geometrical optics relation of FIG. 2

$$\sin\phi_i = n_i \cdot \sin\alpha_i \qquad (4)$$

$$\sin\phi_i' = n_i \cdot \sin\alpha_i' \qquad (4')$$

$$\alpha_i' = \alpha_i + \theta_i \qquad (4'')$$

Therefore, the ideal achromatic condition is obtained when the left side member $\epsilon$ of equation (1) is zero and the following equation is obtained from the above equations (2), (4), (4') and (4'')

$$\frac{\delta n_1}{\delta n_2} = m_2 \cdot \frac{f(\phi_2; n_2 \theta_2)}{f(\phi_1; n_1 \theta_1)} \quad (5)$$

$$= m_2 \frac{\dfrac{\sin\theta_2}{\cos\left[\theta_2 + \sin^{-1}\left(\dfrac{1}{n_2}\sin\phi_2\right)\right] \cdot \cos\phi_2}}{\dfrac{\sin\theta_1}{\cos\left[\theta_1 + \sin^{-1}\left(\dfrac{1}{n_1}\sin\phi_1\right)\right] \cdot \cos\phi_1}}$$

Then, the conventional first and second prisms have been constructed so that generally their refractive indices ($n_1$, $n_2$), vertical angles ($\theta_1$, $\theta_2$), and beam incident angles ($\phi_1$, $\phi_2$) are not combined with considerable differences in value. Thus, conceiving to establish an achromatic condition in accordance with this conventional construction, we obtain the following $$f(\phi_1; n_1 \theta_1) = f(\phi_2; n_2 \theta_2) \quad (20)$$

and also $m_2 > 1$ thus leading to $\delta n_1/\delta n_2 > 1$ in equation (5).

In other words, by selecting the dispersion of the first prism 1 on the light source side to be greater than the dispersion of the second prism 2 on the side of the surface to be irradiated, it is possible to practically compensate the chromatic aberration without any difficulty.

Of course, there exists a solution leading to $\delta n_1/\delta n_2 < 1$ in equation (5), and it is needless to say that the achromatism can be ensured by the combination of a dispersion ratio resulting in $\delta n_1/\delta n_2 < 1$ depending on the setting of the vertical angles and refractive indices of the prisms and the incident and exit angles of the beam.

Also, while, in the case of the beam transformation optical system which expands the beam, there are many instances where it is required to arrange the prisms 1 and 2 in a manner that the beam comes out at right angles from each of the prisms (that is, the exit angle is zero degree), and in this case the chromatic aberration $\epsilon$ is given as follows $$\epsilon = \delta n_2 \cdot \tan\theta_2 \delta n_1 \cdot \tan\theta_1/m_2 \; [\text{rad}\cdot\text{nm}^{-1}] \quad (6)$$

In the right hand member of equation (6), the first term represents the chromatic aberration due to the second prism 2 and the second term represents the chromatic aberration due to the first prism 1.

Then, using the following relation between the vertical angles and the magnifications $$\sin^2 \theta_i = (m_i^2 - 1)/(n_i^2 m_i^2 - 1) \; (\text{where } i=1,2) \quad (7)$$

the achromatic condition is obtained from equation (6), as follows $$\left(\frac{\delta n_1}{\delta n_2}\right)^2 = \left(\frac{\tan\theta_2}{\tan\theta_1} m_2\right)^2 \quad (8)$$

$$= \frac{n_1^2 - 1}{n_2^2 - 1} \cdot \frac{m_2^2 - 1}{m_1^2 - 1} m_1^2$$

Naturally, equations (6) and (8) respectively correspond to equations (1) and (5) when it is set that $\phi_1 = \phi_2 = 0$ (deg).

As described hereinabove, when constructing the ideal beam transformation achromatic optical system, while the first and second prisms 1 and 2 can be designed and arranged so as to satisfy the condition of equation (5) (equation (8)) from the beginning and thereby to substantially completely compensate the chromatic aberration, it is in fact not always necessary to completely satisfy the condition of equation (5).

In other words, as described hereunder, it is desirable to construct the optical system so as to satisfy a practical achromatic condition (9) corresponding to the general condition (5) concerning the ideal achromatism or a practical achromatic condition (9') corresponding to the ideal achromatic condition and it should be understood that these cases come within the technical scope of the present invention $$0 \leq \frac{\left|\dfrac{\delta n_1}{\delta n_2} - R\right|}{\dfrac{\delta n_1}{\delta n_2} + R} < 0.15 \quad (9)$$

where R in equation (9) is given as follows $$R = m_2 \frac{\dfrac{\sin\theta_2}{\cos\left[\theta_2 + \sin^{-1}\left(\dfrac{1}{n_2}\sin\phi_2\right)\right] \cdot \cos\phi_2}}{\dfrac{\sin\theta_1}{\cos\left[\theta_1 + \sin^{-1}\left(\dfrac{1}{n_1}\sin\phi_1\right)\right] \cdot \cos\phi_1}}$$

$$0 \leq \frac{\left|\dfrac{\delta n_1}{\delta n_2} - m_2\dfrac{\tan\theta_2}{\tan\theta_1}\right|}{\dfrac{\delta n_1}{\delta n_2} + m_2\dfrac{\tan\theta_2}{\tan\theta_1}} < 0.15 \quad (9')$$

It is to be noted that in order to accomplish a satisfactory achromatism from practical point of view, it is desirable to construct so that the upper limit for the value of the above-mentioned equation (9) or (9') is set to 0.1 and this value becomes smaller than the upper limit value of 0.1.

Also, by suitably selecting the vertical angles and magnifications of the kind of glass of these prisms, it is possible to make the incident light ray on the first prism and the emerging light ray from the second prism parallel to each other. If the incident light ray and the emerging light ray are parallel to each other, the construction of the optical system is simplified and it is preferable to take this fact into consideration from the standpoint of designing. At this time, in order to accomplish a satisfactory chromatic aberration compensation while maintaining parallel the directions of the incident light on the first prism 1 on the light source side and the emerging light from the second prism 2 on the side of the surface to be irradiated, it is more preferable to construct in such a manner that the dispersion of the first prism 1 is greater than that of the second prism 2. Incidentally, the following is the condition required for the incident light ray and the emerging light ray to be parallel to each other $$(n_1 - 1/m_1) \cdot \sin 2\theta_1 = (n_2 - 1/m_2) \cdot \sin 2\theta_2 \quad (10)$$

Beam transformation optical systems constructed by forming first and second prisms into a wedge shape, selecting variously their vertical angles, refractive indices and dispersions and setting the beam transformation ratios (the magnification $m_1$ of the first prism X the magnification $m_2$ of the second prism) of the optical systems on the whole to 2.5 will be shown later as embodiments 1 to 8. Also, the conventional beam transformation optical systems (having the same beam transformation ratio of 2.5 as the embodiments) which are not satisfying the essential requirements of the present invention will be shown later as comparative examples 1 and 2. The detailed conditions of these embodiments and comparative examples will be described later as a whole.

Then, each of the beam transformation optical systems of the embodiments 1 to 8 and the comparative examples 1 and 2 was incorporated in the optical head of an optical disk apparatus and the amount of deviation $\delta=f\cdot\epsilon$ ($\mu m \cdot nm^{-1}$) per nm of the wavelength of the beam spot on the optical disk was determined under the conditions of the central wavelength $\lambda=830$ nm and the objective lens focal length $f=4$ mm.

The constructional features of the respective embodiments will now be described.

It is to be noted that the embodiments 1 to 7 show cases in which the dispersion of the first prism on the light source side is made relatively high as compared with the dispersion of the second prism on the surface to be irradiated, that is, the relation of $\delta n_1/\delta n_2 > 1$ is satisfied and the embodiment 8 shows a case in which the dispersion of the first prism on the light source side is made relatively low as compared with the dispersion of the second prism on the side of the surface to be irradiated, that is, the relation of $\delta n_1/\delta n_2 < 1$ is satisfied.

Embodiments: 1, 2

These embodiments are so constructed that the incident light ray on the first prism and the emerging light ray from the second prism are parallel to each other.

Embodiments: 3, 4

These embodiments are constructed so that the occurrence of chromatic aberration is reduced further without considering the condition for making the incident light ray on the first prism and the emerging light ray from the second prism parallel to each other.

Embodiments: 5, 6

In these embodiments, the first and second prisms have the same magnification but the incident light ray on the first prism and the emerging light ray are not parallel to each other.

Embodiment: 7

With this embodiment, an investigation was made into a case where the first and second prisms were substantially the same in refractive index.

Here, if the two prisms are the same in refractive index and shape, they are also equal in vertical angle and magnification and therefore the condition for parallelism of the incident light ray and the emergent light ray is satisfied by equation (10).

The achromatic condition is obtained from equation (8) as follows $$\delta n_1/\delta n_2 = m_1 = m_2 \quad (11)$$

In other words, by combining two prisms having the same shape and made of glass so that they are equal in refractive index $$n_1 = n_2 \quad (12)$$

and their dispersion ratio satisfies the following $$\delta n_1/\delta n_2 = m_1 = m_2 - \sqrt{\text{beam transformation ratio}} \quad (12')$$

it is possible to realize a beam transformation prism optical system which simultaneously satisfies the achromatic condition and the parallelism condition.

The beam transformation optical system of the embodiment 7 is constructed so as to satisfy the above-mentioned equations (12) and (12') so that the two prisms are substantially equal in refractive index and vertical angle and the incident light ray and the emerging light ray are parallel to each other.

While it is a matter of course that the chromatic aberration can be compensated even if the refractive indice are not equal as in the case of the embodiments 1 to 6, even in cases where the prisms are not equal in refractive index, the refractive indice of the practically used prisms do not differ greatly and therefore they can be used as criteria for the dispersion ratio of equation (12') as well as the initial values for the optimization of a chromatic aberration compensation.

Embodiment: 8

This embodiment is so designed that a magnification of a certain degree is obtained by the first prism on the light source side and the chromatic aberration caused in the first prism is compensated satisfactorily.

As will be seen from the above equation (6), where the left side member $\epsilon$ of equation (6) is reduced to zero to compensate the chromatic aberration, the following relation holds $$\delta n_2 \cdot \tan\theta_2 = \delta n_1 \cdot \tan\theta_1/m_2 \quad (13)$$

Here, in the present embodiment the first prism provides a high magnification and therefore the vertical angle $\theta_1$ of the first prism is increased. As a result, the dispersion $\delta n_2$ of the second prism in the left hand member of equation (13) is increased by an amount corresponding to the increase in the right side member of equation (13) and the chromatic aberration of the optical system on the whole is compensated in a well balanced manner.

Comparative Example: 1

This is a beam transformation optical system composed of a single prism.

Comparative Example: 2

In this example, first and second prisms are made of glass of the same kind (that is, they are the same in refractive index and dispersion) and the first and second prisms are also the same in shape.

The various elements of the beam transformation optical systems of the embodiments 1 to 8 and the comparative examples 1 and 2 and the data on the amounts of deviation of the beam spot on the optical disk will now be shown as a whole.

Here
n=the refractive index at a wavelength of 830 nm,
$\delta n$=the dispersion (the change of the refractive index per nm at the wavelength 830 nm)($\times 10^{-5} \cdot nm^{-1}$),
mag=the magnification of each prism,
$\theta$=the vertical angle (deg) of each prism,
$\phi'$=the incident angle (deg) at which the light ray is incident onto each prism, $\phi$=the exit angle at which the light ray emerges from each prisms, $\epsilon$=the deviation angle (rad·nm$^{-1}$) due to the chromatic aberration with CCW representing a positive sign, $\delta$=the amount of deviation=f·$\epsilon$ ($\mu$m·nm$^{-1}$) of the spot on the disk due to the chromatic aberration, and $\Delta$=the corresponding values of the above equation (9) or (9').

It is to be noted that the parallelism (deg) represents the angle formed by the incident light ray and the emerging light ray and its statement is omitted in the case of the embodiments satisfying the condition for parallelism.

The various elements and the data of the embodiments 1 to 8 and the comparative examples 1 and 2 will be shown hereunder.

|  | first prism | second prism |
|---|---|---|
| Embodiment: 1 |  |  |
| n | 1.634291 | 1.510241 |
| $\delta$ n | 3.753 | 1.936 |
| mag | 1.519 | 1.646 |
| $\theta$ | 30.21371 | 35.06045 |
| $\phi$' | 55.32767 | 60.17441 |
| $\phi$ | 0.0 | 0.0 |
| $\epsilon$ |  | 3.0735E-7 |
| $\delta$ |  | 0.00123 |
| $\Delta$ |  | 0.0114 |
| Embodiment: 2 |  |  |
| n | 1.657528 | 1.510241 |
| $\delta$ n | 4.039 | 1.936 |
| mag | 1.509 | 1.656 |
| $\theta$ | 29.53753 | 35.16027 |
| $\phi$' | 54.80056 | 60.42330 |
| $\phi$ | 0.0 | 0.0 |
| $\epsilon$ |  | −1.8039E-7 |
| $\delta$ |  | −0.00072 |
| $\Delta$ |  | 0.0066 |
| Embodiment: 3 |  |  |
| n | 1.634291 | 1.510241 |
| $\delta$ n | 3.753 | 1.936 |
| mag | 1.532 | 1.632 |
| $\theta$ | 30.36725 | 34.93019 |
| $\phi$' | 55.71041 | 59.85196 |
| $\phi$ | 0.0 | 0.0 |
| $\epsilon$ |  | 5.0E-8 |
| $\delta$ |  | 0.00020 |
| $\Delta$ |  | 0.00185 |
| (parallelism 0.42138 deg) |  |  |
| Embodiment: 4 |  |  |
| n | 1.657528 | 1.510241 |
| $\delta$ n | 4.039 | 1.936 |
| mag | 1.499 | 1.668 |
| $\theta$ | 29.39888 | 35.26943 |
| $\phi$' | 54.45493 | 60.69734 |
| $\phi$ | 0.0 | 0.0 |
| $\epsilon$ |  | 5.0E-8 |
| $\delta$ |  | 0.00020 |
| $\Delta$ |  | 0.00188 |
| (parallelism 0.37186 deg) |  |  |
| Embodiment: 5 |  |  |
| n | 1.591647 | 1.510241 |
| $\delta$ n | 3.196 | 1.936 |
| mag | 1.581 | 1.581 |
| $\theta$ | 32.02770 | 34.38898 |
| $\phi$' | 57.57531 | 58.53911 |
| $\phi$ | 0.0 | 0.0 |
| $\epsilon$ |  | 6.0635E-7 |
| $\delta$ |  | 0.00243 |
| $\Delta$ |  | 0.0234 |
| (parallelism 1.39747 deg) |  |  |
| Embodiment: 6 |  |  |
| n | 1.612992 | 1.510241 |
| $\delta$ n | 3.470 | 1.936 |
| mag | 1.581 | 1.581 |
| $\theta$ | 31.46826 | 34.38898 |
| $\phi$' | 57.35448 | 58.3911 |
| $\phi$ | 0.0 | 0.0 |
| $\epsilon$ |  | −1.8134E-7 |
| $\delta$ |  | −0.00073 |
| $\Delta$ |  | 0.0068 |
| (parallelism 1.73609 deg) |  |  |
| Embodiment: 7 |  |  |
| n | 1.721700 | 1.722245 |
| $\delta$ n | 5.003 | 3.206 |
| mag | 1.5813 | 1.5809 |
| $\theta$ | 28.93087 | 28.91503 |
| $\phi$' | 56.39565 | 56.37981 |
| $\phi$ | 0.0 | 0.0 |
| $\epsilon$ |  | 2.1775E-7 |
| $\delta$ |  | 0.00087 |
| $\Delta$ |  | 0.0062 |
| Embodiment: 8 |  |  |
| n | 1.510241 | 1.634291 |
| $\delta$ n | 1.936 | 3.753 |
| mag | 2.211 | 1.131 |
| $\theta$ | 38.24100 | 19.84525 |
| $\phi$' | 69.19502 | 33.69767 |
| $\phi$ | 0.0 | 0.0 |
| $\epsilon$ |  | 5.0E-8 |
| $\delta$ |  | 0.00020 |
| $\Delta$ |  | 0.0019 |
| (parallelism 17.10160 deg) |  |  |
| Comparative example: 1 |  |  |
| n | 1.510241 |  |
| $\delta$ n | 1.936 |  |
| mag | 2.5 |  |
| $\theta$ | 39.00162 |  |
| $\phi$' | 71.88947 |  |
| $\phi$ | 0.0 |  |
| $\epsilon$ | 1.5678E-5 |  |
| $\delta$ | 0.06271 |  |
| Comparative example: 2 |  |  |
| n | 1.510241 | 1.510241 |
| $\delta$ n | 1.936 | 1.936 |
| mag | 1.581 | 1.581 |
| $\theta$ | 34.38898 | 34.38898 |
| $\phi$' | 58.53912 | 58.53912 |
| $\phi$ | 0.0 | 0.0 |
| $\epsilon$ |  | 4.8703E-6 |
| $\delta$ |  | 0.01948 |
| $\Delta$ |  | 0.2251 |

From the foregoing results it will be seen that in the beam transformation optical systems according to the embodiments of the present invention the amounts of deviation of the beam spots due to the chromatic aberration are reduced to from one tenth to one hundredth as compared with the comparative examples and the chromatic aberration is compensated quite satisfactorily. Particularly, a comparison between those corresponding to the cases each using the two prisms, that is, the comparative example 2 (the prisms are the same in refractive index, dispersion and shape) and the embodiment 7 (the prisms are substantially the same in refractive index and shape but different in dispersion. $\delta n_1 > \delta n_2$) shows that by selecting the dispersion of the first prism greater than the dispersion of the second prism, it is possible to compensate the chromatic aberration with an appreciably greater accuracy.

Also, it will be seen that in the case of the embodiment 8 satisfying the relation of $\delta n_1 < \delta n_2$, the chromatic aberration is compensated in an appreciably appropriate manner as compared with the comparative example 2.

Figure 3:
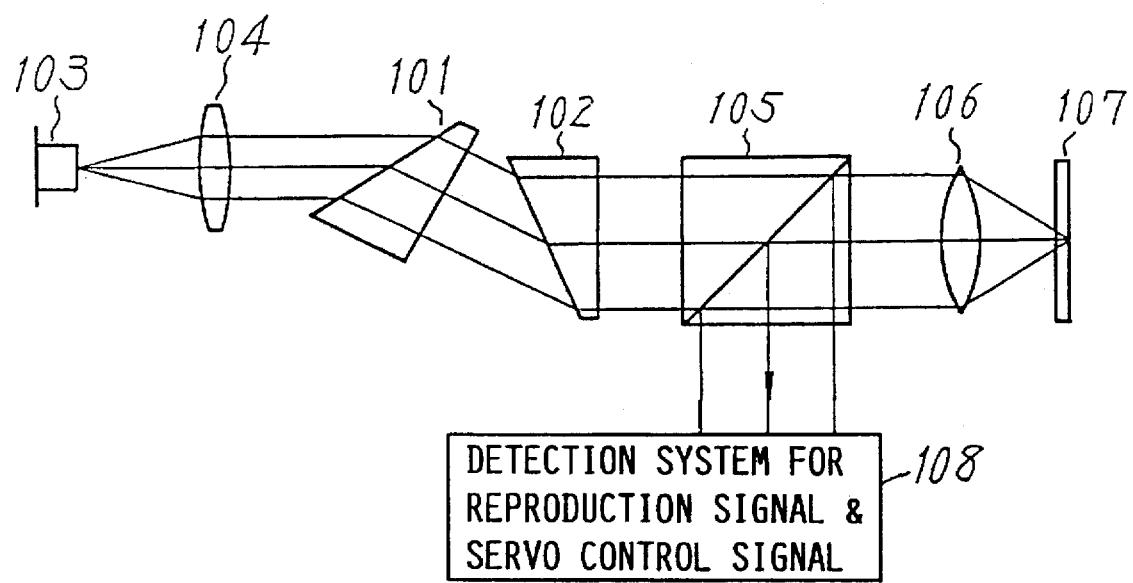
FIG. 3 is a schematic diagram showing the principal part of an optical system of an optical head in an optical disk apparatus using the achromatic optical system according to the present invention.

Referring now to FIG. 3, there is illustrated an optical path diagram showing schematically the construction of an optical system which is applied by way of example to the optical system of a recording/reproducing optical head of an optical disk apparatus.

In FIG. 3, the elliptical beam emitted from a semiconductor laser 103 is converted to a collimated beam by a collimator lens 104 and it is then passed through a beam transformation achromatic optical system composed of first and second prisms 101 and 102. Thus, the minor axis of the beam is expanded by this achromatic optical system and the beam is transformed into a circular beam. Then, the beam is passed through a polarization beam splitter 105 and it is then condensed to a spot of beam on a disk 107 through an objective lens 106.

If the disk 107 comprises for example a magneto-optical disk, the recording of information is effected in such a manner that with an external magnetic field preliminarily applied to the disk 107, a given portion of its magnetic thin film is heated by the projection of a beam and the direction of the magnetization of the heated portion is reversed. Also, the reproduction of the information is effected by projecting a beam onto the disk 107 formed with the record pits (here not only those in the form of recesses but also others corresponding to digital signals to be reproduced are generally referred to as pits) and thereby utilizing the fact that the direction of rotation of the reflected light of the projected beam in the vibration plane differs depending on the direction of magnetization of the magnetic thin film. In other words, the reflected light from the disk 107 is reflected by the beam splitter 105 so that it is directed to a reproduction signal and servo control signal detection system 108 where the information is read out. Also, in order to effect the follow-up of the relative position of the recording track of the disk 107 and the beam spot, the reproduction signal and servo control signal detection system 168 performs the detection of a tracking servo signal and a focusing servo signal from the reflected light. These servo signals are respectively used for the tracking and focusing controls of the optical head.

Also, it is needless to say that the achromatic optical system for beam transformation according to the present invention is not only effectively usable with the optical heads of various optical recording and reproducing apparatus irrespective of recording media and recording methods but also widely applicable to optical systems required to effect the transformation of beam cross-sectional shapes in addition to the optical heads.

What is claimed is:

1. An achromatic optical system for beam transformation which is arranged in an optical path traversed by a beam emitted from a light source to reach a surface to be irradiated, said system comprising:

first simplex prism made of a single material and arranged on the side of said light source and a second simplex prism made of a single material and arranged on the side of said surface to be irradiated;

said first prism being constructed in such a manner that an incident angle of said beam incident on said first prism from said light source is greater than an exit angle of said beam emerging from a beam exit surface of said first prism so as to expand the width of said beam passed through said first said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is equal to or smaller than that of said second prism, that the beam incident angle of said first prism is smaller than the beam incident angle of said second prism, and that the beam exit angle of said first prism and the beam exit angle of said second prism are both selected to be zero degrees, said first prism and said second prism being construted in such a manner that the refractive index of said first prism is larger than that of said second prism, that the dispersion $\delta n_i$ of said first prism and the dispersion $\delta n_2$ of said second prism are selected to satisfy the expression $\delta n_1/\delta n_2 > 1$, and that the vertical angle of said first prism is smaller than that of said second prism, said beam exit surface of said first prism and said beam entrance surface of said second prism being inclined relative to each other, and said first and second prisms being further constructed so as to satisfy a condition determined by the following equation $$\frac{\delta n_1}{\delta n_2} = m_2 \frac{\cos\left[\theta_2 + \sin^{-1}\left(\frac{1}{n_2}\sin\phi_2\right)\right] \cdot \cos\phi_2}{\cos\left[\theta_1 + \sin^{-1}\left(\frac{1}{n_1}\sin\phi_1\right)\right] \cdot \cos\phi_1}$$

where $n_1$=the refractive index of the first prism $n_2$ the refractive index of the second prism $\delta_{n_1}$=the dispersion of the first prism $\delta_{n_2}$=the dispersion of the second prism $\theta_1$=the vertical angle of the first prism $\theta_2$=the vertical angle of the second prism $\phi_1$=the exit angle of the beam from the first prism $\phi_2$=the exit angle of the beam from the second prism $m_2$=the magnification of the beam by the second prism.

2. An achromatic optical system for beam transformation which is arranged in an optical path traversed by a beam emitted from a light source to reach a surface to be irradiated, said system comprising:

a first simplex prism made of a single material and arranged on the side of Said light source and a second simplex prism made of a single material and arranged on the side of said surface to be irradiated;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said prism is equal to or smaller than that of said second prism, that the beam incident angle of said first prism is smaller than the beam incident angle of said second prism, and that the beam exit angle of said first prism and the beam exit angle of said second prism are both selected to be zero degrees, said first prism and said second prism being constructed in such a manner that the refractive index of said first prism is larger than that of said second prism, that the dispersion $\delta n_1$ of said first prism and the dispersion $\delta n_2$ of said second prism are selected to satisfy the expression $\delta n_1 / \delta n_2 > 1$, and that the vertical angle of said first prism is smaller than that of said second prism, said beam exit surface of said first prism and said beam entrance surface of said second prism being inclined relative each other, and said first and second prisms being further constructed so as to satisfy a condition determined by the following equation $$0 \leq \frac{\left| \frac{\delta n_1}{\delta n_2} - R \right|}{\frac{\delta n_2}{\delta n_1} + R} < 0.15$$

where $$R = m_2 \frac{\sin\theta_2}{\cos\left[\theta_2 + \sin^{-1}\left(\frac{1}{n_2}\sin\phi_2\right)\right] \cdot \cos\phi_2} \Big/ \frac{\sin\theta_1}{\cos\left[\theta_1 + \sin^{-1}\left(\frac{1}{n_1}\sin\phi_1\right)\right] \cdot \cos\phi_1}$$

and where $n_1$=the refractive index of the first prism
$n_2$=the refractive index of the second prism
$\delta n_1$=the dispersion of the first prism
$\delta n_2$=the dispersion of the second prism
$\theta_1$=the vertical angle of the first prism
$\theta_2$=the vertical angle of the second prism
$\phi_1$=the exit angle of the beam from the first prism
$\phi_2$=the exit angle of the beam from the second prism.
$m_2$=the magnification of the beam by the second prism.

3. An optical disk apparatus comprising:

a light source for supplying a light an achromatic beam transformation optical system for expanding the width of said beam from said light source; and an objective lens for condensing said beam passed through said optical system onto an optical disk, said achromatic optical system having a chromatic aberration thereof compensated so as to compensate a vibration of a beam condensing position on said optical disk due to wavelength vibrations of said beam from said light source, said achromatic optical system including a first simplex prism made of a single material and arranged on the side of said light source and a second simplex prism made of a single material and arranged on the side of said objective lens, said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and second prism being arranged apart from each other to form a space between said beam exit surface of said first prism and said beam entrance surface of said second prism, said beam exit surface of said first optical member and said beam entrance surface of said second optical member being inclined with each other, said first and second optical members being different in dispersion from each other, said first prism and said second prism being further arranged in such a manner that a beam magnification of said first prism is equal to or smaller than that of said second prism, that the beam incident angle of said first prism is smaller than the beam incident angle of said second prism, and that the beam exit angle of said first prism and the beam exit angle of said second prism are both selected to be zero degrees, said first prism and said second prism being construted in such a manner that the refractive index of said first prism is larger then that of said second prism, that the dispersion $\delta n_1$ of said first prism and the dispersion $\delta n_2$ of said second prism are selected to satisfy the expression $\delta n_1 / \delta n_2 > 1$, and that the vertical angle of said first prism is smaller than that of said second prism.

said beam exit surface of said first prism and said beam entrance surface of said second prism being inclined relative to each other, and said first and second prisms being further constructed so as to satisfy a condition determined by the following equation $$\frac{\delta n_1}{\delta n_2} = m_2 \frac{\sin\theta_2}{\cos\left[\theta_2 + \sin^{-1}\left(\frac{1}{n_2}\sin\phi_2\right)\right] \cdot \cos\phi_2} \Big/ \frac{\sin\theta_1}{\cos\left[\theta_1 + \sin^{-1}\left(\frac{1}{n_1}\sin\phi_1\right)\right] \cdot \cos\phi_1}$$

where $n_1$=the refractive index of the first prism
$n_2$=the refractive index of the second prism $\delta n_1$=the dispersion of the first prism
$\delta n_2$=the dispersion of the second prism
$\theta_1$=the vertical angle of the first prism
$\theta_2$=the vertical angle of the second prism
$\phi_1$=the exit angle of the beam from the first prism
$\phi_2$=the exit angle of the beam from the second prism
$m_2$=the magnification of the beam by the second prism.

4. An achromatic optical system for beam transformation which is arranged in an optical path traversed by a beam emitted from a light source to reach a surface to be irradiated, said system comprising:

a first simplex prism made of a single material and arranged on the side of said light source and a second simplex prism made of a single material and arranged on the side of said surface to be irradiated;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is smaller than that of said second prism, and that the beam incident angle of said first prism is smaller than the beam incident angle of said second prism, said first prism and said second prism being construted in such a manner that the refractive index of said first prism is larger than that of said second prism, that the dispersion $\delta n_1$ of said first prism and the dispersion $\delta n_2$ of said second prism are selected to satisfy the expression $\delta n_1/\delta n_2>1$, and that the vertical angle of said first prism is smaller than that of said second prism, said beam exit surface of said first prism and said beam entrance surface of said second prism being inclined relative to each other, the beam exit angle of said first prism and the beam exit angle of said second prism being both selected to be zero degrees, and said first and second prisms being further constructed so as to satisfy a condition determined by the following equation $$\left(\frac{\delta n_1}{\delta n_2}\right)^2 = \frac{n_1^2-1}{n_2^2-1} \cdot \frac{m_2^2-1}{m_1^2-1} \cdot m_1^2$$

where $n_1$=the refractive index of the first prism
$n_2$=the refractive index of the second prism
$\delta n_1$=the dispersion of the first prism $\delta n_2$=the dispersion of the second prism
$m_1$=the magnification of the beam by the first prism
$m_2$=the magnification of the beam by the second prism.

5. An achromatic optical system for beam transformation which is arranged in an optical path traversed by a beam emitted from a light source to reach a surface to be irradiated, said system comprising:

a first simplex prism made of a single material and arranged on the side of said light source and a second simplex prism made of a single material and arranged on the side of said surface to be irradiated;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is equal to or smaller than that of said second prism, and that the beam incident angle of said first prism is smaller than the beam incident angle of said second prism, said first prism and said second prism being constituted in such a manner that the refractive index of said first prism is larger than that of said second prism, that the dispersion $\delta n_1$ of said first prism and the dispersion $\delta n_2$ of said second prism are selected to satisfy the expression $\delta n_1/\delta n_2>1$, and that the vertical angle of said first prism is smaller than that of said second prism, said beam exit surface of said first prism and said beam entrance surface of said second prism being inclined relative to each other, the beam exit angle of said first prism and the beam exit angle of said second prism being both selected to be zero degrees, and said first and second prisms being further constructed so as to satisfy a condition determined by the following equation $$0 \leq \frac{\left|\frac{\delta n_1}{\delta n_2} - m_2 \frac{\tan\theta_2}{\tan\theta_1}\right|}{\frac{\delta n_2}{\delta n_1} + m_2 \frac{\tan\theta_2}{\tan\theta_1}} < 0.15$$

where $n_1$=the refractive index of the first prism
$n_2$=the refractive index of the second prism
$\delta n_1$=the dispersion of the first prism
$\delta n_2$=the dispersion of the second prism
$\theta_1$=the vertical angle of the first prism $\theta_2$=the vertical angle of the second prism $m_2$=the magnification of the beam by the second prism.

6. An achromatic optical system according to claim 5, wherein said first and second prisms are further constructed in accordance with the data stated as follows:

|   | first prism | second prism |
|---|---|---|
| n | 1.634291 | 1.510241 |
| δ n | 3.753 | 1.936 |
| mag | 1.519 | 1.646 |
| θ | 30.21371 | 35.06045 |
| φ' | 55.32767 | 60.17441 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ represents the incident angle (deg) of the beam incident on each prism, and φ represents the exit angle of the beam emerging from each prism.

7. An achromatic optical system according to claim 5, wherein said first and second prisms are further constructed in accordance with the data stated as follows:

|   | first prism | second prism |
|---|---|---|
| n | 1.657528 | 1.510241 |
| δ n | 4.039 | 1.936 |
| mag | 1.509 | 1.656 |
| θ | 29.53753 | 35.16027 |
| φ' | 54.80056 | 60.42330 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

8. An achromatic optical system according to claim 5, wherein said first and second prisms are further constructed in accordance with the data stated as follows:

|   | first prism | second prism |
|---|---|---|
| n | 1.634291 | 1.510241 |
| δ n | 3.753 | 1.936 |
| mag | 1.532 | 1.632 |
| θ | 30.36725 | 34.93019 |
| φ' | 55.71041 | 59.85196 |
| φ | 0 | 0 | where, n represents the refractive index at a wavelength 830 nm, δrepresents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

9. An achromatic optical system according to claim 5, wherein said first and second prisms are further constructed in accordance with the data stated as follows:

|   | first prism | second prism |
|---|---|---|
| n | 1.657528 | 1.510241 |
| δ n | 4.039 | 1.936 |
| mag | 1.499 | 1.668 |
| θ | 29.39888 | 35.26943 |
| φ' | 54.45493 | 60.69734 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

10. An achromatic optical system according to claim 5, wherein said first and second prisms are further constructed in accordance with the data stated as follows:

|   | first prism | second prism |
|---|---|---|
| n | 1.591647 | 1.510241 |
| δ n | 3.196 | 1.936 |
| mag | 1.581 | 1.581 |
| θ | 32.02770 | 34.38898 |
| φ' | 57.57531 | 58.53911 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

11. An achromatic optical system according to claim 5, wherein said first and second prisms are further constructed in accordance with the data stated as follows:

|   | first prism | second prism |
|---|---|---|
| n | 1.612992 | 1.510241 |
| δ n | 3.470 | 1.936 |
| mag | 1.581 | 1.581 |
| θ | 31.46826 | 34.38898 |
| φ' | 57.35448 | 58.53911 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

12. An achromatic optical system for beam transformation which is arranged in an optical path traversed by a beam emitted from a light source to reach a surface to be irradiated, said system comprising:

a first simplex prism made of a single material and arranged on the side of said light source and a second simplex prism made of a single material and arranged on the side of said surface to be irradiated;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is substantially equal to that of said second prism, and that the beam incident angle of said first prism is substantially equal to the beam incident angle of said second prism, said first prism and said second prism being construted in such a manner that the refractive index of said first prism is substantially equal to that of said second prism, that the dispersion $\delta n_1$ of said first prism and the dispersion $\delta n_2$ of said second prism are selected to satisfy the expression $\delta n_1/\delta n_2 = m_1$, where $m_1$ represents the beam magnification of aid first prism, and that the vertical angle of said first prism is substantially equal to that of said second prism, said beam exit surface of said first prism and said beam entrance surface of said second prism being inclined relative to each other, the beam exit angle of said first prism and the beam exit angle of said second prism being both selected to be zero degrees, and said first and second prisms being further constructed so as to satisfy a condition determined by the following equation $$0 \leq \frac{\left|\frac{\delta n_1}{\delta n_2} - m_2 \frac{\tan\theta_2}{\tan\theta_1}\right|}{\frac{\delta n_2}{\delta n_1} + m_2 \frac{\tan\theta_2}{\tan\theta_1}} < 0.15$$

where $n_1$=the refractive index of the first prism
$n_2$=the refractive index of the second prism
$\delta n_1$=the dispersion of the first prism
$\delta n_2$=the dispersion of the second prism
$\theta_1$=the vertical angle of the first prism
$\theta_2$=the vertical angle of the second prism
$m_2$=the magnification of the beam by the second prism.

13. An achromatic optical system according to claim 12, wherein said first and second prisms are further constructed in accordance with the data stated as follows:

|  | first prism | second prism |
|---|---|---|
| n | 1.721700 | 1.722245 |
| $\delta n$ | 5.003 | 3.206 |
| mag | 1.5813 | 1.5809 |
| $\theta$ | 28.93087 | 28.91503 |
| $\phi'$ | 56.39565 | 56.37981 |
| $\phi$ | 0 | 0 | where, n represents the refractive index at a wavelength of 830 nm, $\delta n$ represents the dispersion or the change of the refractive index per 1 nm at the wavelength 830 nm ($\times 10^{-5}$/nm), mag represents the beam magnification of each prism,
$\theta$ represents the vertical angle (deg) of each prism,
$\phi'$ represents the incident angle (deg) of the beam incident on each prism, and $\phi$ represents the exit angle of the beam emerging from each prism.

14. An achromatic optical system for beam transformation which is arranged in an optical path traversed by a beam emitted from a light source to reach a surface to be irradiated, said system comprising:

a first simplex prism made of a single material and arranged on the side of said light source and a second simplex prism made of a single material and arranged on the side of said surface to be irradiated;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is larger than that of said second prism, and that the beam incident angle of said first prism is greater than the beam incident angle of said second prism, said first prism and said second prism being construted in such a manner that the refractive index of said first prism is smaller than that of said second prism, that the dispersion $\delta n_1$ of said first prism and the dispersion $\delta n_2$ of said second prism are selected to satisfy the expression $\delta n_1/\delta n_2 = <1$, and that the vertical angle of said first prism is greater than that of said second prism, said beam exit surface of said first prism and said beam entrance surface of said second prism being inclined relative to each other, the beam exit angle of said first prism and the beam exit angle of said second prism being both selected to be zero degrees, and said first and second prisms being further constructed so as to satisfy a condition determined by the following equation $$0 \leq \frac{\left|\frac{\delta n_1}{\delta n_2} - m_2 \frac{\tan\theta_2}{\tan\theta_1}\right|}{\frac{\delta n_2}{\delta n_1} + m_2 \frac{\tan\theta_2}{\tan\theta_1}} < 0.15$$

where $n_1$=the refractive index of the first prism
$n_2$=the refractive index of the second prism
$\delta n_1$=the dispersion of the first prism
$\delta n_2$=the dispersion of the second prism
$\theta_1$=the vertical angle of the first prism
$\theta_2$=the vertical angle of the second prism
$m_2$=the magnification of the beam by the second prism.

15. An achromatic optical system according to claim 14, wherein said first and second prisms are further constructed in accordance with the data stated as follows:

|      | first prism | second prism |
|------|-------------|--------------|
| n    | 1.510241    | 1.634291     |
| δ n  | 1.936       | 3.753        |
| mag  | 2.211       | 1.131        |
| θ    | 38.24100    | 19.84525     |
| φ'   | 69.19502    | 33.69767     |
| φ    | 0           | 0            | where, n represents the refractive index at a wavelength of 830 nm, δn represents the dispersion or the change of the refractive index per 1 nm at the wavelength 830 nm ($\times 10^{-5}$/nm),
mag represents the beam magnification of each prism,
θ represents the vertical angle (deg) of each prism,
φ' represents the incident angle (deg) of the beam incident on each prism, and φ represents the exit angle of the beam emerging from each prism.

16. An optical disk apparatus comprising:
a light source for supplying a light beam;
an achromatic beam transformation optical system for expanding the width of said beam from said light source; and
an objective lens for condensing said beam passed through said optical system onto an optical disk,
said achromatic optical system having a chromatic aberration thereof compensated so as to compensate a vibration of a beam condensing position on said optical disk due to wavelength vibrations of said beam from said light source,
said first prism being constructed in such a manner that an incident angle of said beam incident on said first prism from said lift source is greater than an exit angle of said beam emerging from a beam exit surface of said first prism so as to expand the width of said beam passed through said first prism,
said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism,
said first prism and said second prism being different in dispersion from each other and being arranged apart from each other to form a space between said beam exit surface of said first prism and said beam entrance surface of said second prism,
said first prism and said second prism being further arranged in such a manner that a beam magnification of said first prism is equal to or smaller than that of said second prism, that the beam incident angle of said first prism is smaller than the beam incident angle of said second prism, and that the beam exit angle of said first prism and the beam exit angle of said second prism are both selected to be zero degrees,
said first prism and said second prism being constructed in such a manner that the refractive index of said first prism is larger than that of said second prism, that the dispersion $\delta n_1$ of said first prism and the dispersion $\delta n_2$ of said second prism are selected to satisfy the expression $\delta n_1/\delta n_2 > 1$, and that the vertical angle of said first prism is smaller than that of said second prism,
said beam exit surface of said first prism and said beam entrance surface of said second prism being inclined relative to each other, and
said first and second prisms being further constructed so as to satisfy a condition determined by the following equation $$0 \leq \frac{\left|\frac{\delta n_1}{\delta n_2} - R\right|}{\frac{\delta n_2}{\delta n_1} + R} < 0.15$$

where $$R = m_2 \frac{\cos\left[\theta_2 + \sin^{-1}\left(\frac{1}{n_2}\sin\phi_2\right)\right] \cdot \cos\phi_2}{\cos\left[\theta_1 + \sin^{-1}\left(\frac{1}{n_1}\sin\phi_1\right)\right] \cdot \cos\phi_1} \cdot \frac{\sin\theta_2}{\sin\theta_1}$$

and where $n_1$=the refractive index of %he first prism
$n_2$=the refractive index of the second prism
$\delta n_1$=the dispersion of the first prism
$\delta n_2$=the dispersion of the second prism
$\theta_1$=the vertical angle of the first prism
$\theta_2$=the vertical angle of the second prism
$\phi_1$=the exit angle of the beam from the first prism
$\phi_2$=the exit angle of the beam from the second prism.
$m_2$=the magnification of the beam by the second prism.

17. An optical disk apparatus comprising:
a light source for supplying a light beam;
an achromatic beam transformation optical system for expanding the width of said beam from said light source; and
an objective lens for condensing said beam passed through said optical system onto an optical disk,
said achromatic optical system having a chromatic aberration thereof compensated so as to compensate a vibration of a beam condensing position on said optical disk due to wavelength vibrations of said beam from said light source,
said achromatic optical system including a first simplex prism made of a single material and arranged on the side of said light source and a second simplex prism made of a single material and arranged on the side of said objective lens;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is smaller than that of said second prism, and that the beam incident angle of said first prism is smaller than the beam incident angle of said second prism, said first prism and said second prism being constructed in such a manner that the refractive index of said first prism is larger than that of said second prism, that the dispersion $\delta n_1$ of said first prism and the dispersion $\delta n_2$ of said second prism are selected to satisfy the expression $\delta n_1/\delta n_2 > 1$, and that the vertical angle of said first prism is smaller than that of said second prism, said beam exit surface of said first prism and said beam entrance surface of said second prism being inclined relative to each other, the beam exit angle of said first prism and the beam exit angle of said second prism being both selected to be zero degrees, and said first and second prisms being further constructed so as to satisfy a condition determined by the following equation $$\left(\frac{\delta n_1}{\delta n_2}\right)^2 = \frac{n_1^2 - 1}{n_2^2 - 1} \cdot \frac{m_2^2 - 1}{m_1^2 - 1} \cdot m_1^2$$

where $n_1$=the refractive index of the first prism $n_2$=the refractive index of the second prism $\delta n_1$=the dispersion of the first prism $\delta n_2$=the dispersion of the second prism $m_1$=the magnification of the beam by the first prism $m_1$=the magnification of the beam by the second prism.

18. An optical disk apparatus comprising:

a light source for supplying a light beam;

an achromatic beam transformation optical system for expanding the width of said beam from said light source; and an objective lens for condensing said beam passed through said optical system onto an optical disk, said achromatic optical system having a chromatic aberration thereof compensated so as to compensate a vibration of a beam condensing position on said optical disk due to wavelength vibrations of said beam from said light source, said achromatic optical system including a first simplex prism made of a single material and arranged on the side of said light source and a second simplex prism made of a single material and arranged on the side of said objective lens;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is equal to or smaller than that of said second prism, and that the beam incident angle of said first prism is smaller than the beam incident angle of said second prism, said first prism and said second prism being construted in such a manner that the refractive index of said first prism is larger than that of said second prism, that the dispersion $\delta n_1$ of said first prism and the dispersion $\delta n_2$ of said second prism are selected to satisfy the expression $\delta n_1/\delta n_2 > 1$, and that the vertical angle of said first prism is smaller than that of said second prism, said beam exit surface of said first prism and said beam entrance surface of said second prism being inclined relative to each other, the beam exit angle of said first prism and the beam exit angle of said escort prism being both selected to be zero degrees, and said first and second prisms being further constructed so as to satisfy a condition determined by the following equation $$0 \leq \frac{\left|\frac{\delta n_1}{\delta n_2} - m_2 \frac{\tan\theta_2}{\tan\theta_1}\right|}{\frac{\delta n_2}{\delta n_1} + m_2 \frac{\tan\theta_2}{\tan\theta_1}} < 0.15$$

where $n_1$=the refractive index of the first prism $n_2$=the refractive index of the second prism $\delta n_1$=the dispersion of the first prism $\delta n_2$=the dispersion of the second prism $\theta_1$=the vertical angle of the first prism $\theta_2$=the vertical angle of the second prism $m_2$=the magnification of the beam by the second prism.

19. An optical disk apparatus according to claim 18, wherein said first and second prisms are further constructed in accordance with the data stated as follows:

|  | first prism | second prism |
|---|---|---|
| n | 1.634291 | 1.510241 |
| δ n | 3.753 | 1.936 |
| mag | 1.519 | 1.646 |
| θ | 30.21371 | 35.06045 |
| φ' | 55.32767 | 60.17441 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

20. An optical disk apparatus according to claim 18, wherein said first and second prisms are further constructed in accordance with the data stated as follows:

|  | first prism | second prism |
|---|---|---|
| n | 1.657528 | 1.510241 |
| δ n | 4.039 | 1.936 |
| mag | 1.509 | 1.656 |
| θ | 29.53753 | 35.16027 |
| φ' | 54.80056 | 60.42330 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

21. An optical disk apparatus according to claim 18, wherein said first and second prisms are further constructed in accordance with the data stated as follows:

|  | first prism | second prism |
|---|---|---|
| n | 1.634291 | 1.510241 |
| δ n | 3.753 | 1.936 |
| mag | 1.532 | 1.632 |
| θ | 30.36725 | 34.93019 |
| φ' | 55.71041 | 59.85196 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

22. An optical disk apparatus according to claim 18, wherein said first and second prisms are further constructed in accordance with the data stated as follows:

|  | first prism | second prism |
|---|---|---|
| n | 1.657528 | 1.510241 |
| δ n | 4.039 | 1.936 |
| mag | 1.499 | 1.668 |
| θ | 29.39888 | 35.26943 |
| φ' | 54.45493 | 60.69734 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

23. An optical disk apparatus according to claim 18, wherein said first and second prisms are further constructed in accordance with the data stated as follows:

|  | first prism | second prism |
|---|---|---|
| n | 1.591647 | 1.510241 |
| δ n | 3.196 | 1.936 |
| mag | 1.581 | 1.581 |
| θ | 32.02770 | 34.38898 |
| φ' | 57.57531 | 58.53911 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

24. An optical disk apparatus according to claim 18, wherein said first and second prisms are further constructed in accordance with the data stated as follows:

|  | first prism | second prism |
|---|---|---|
| n | 1.612992 | 1.510241 |
| δ n | 3.470 | 1.936 |
| mag | 1.581 | 1.581 |
| θ | 31.46826 | 34.38898 |
| φ' | 57.35448 | 58.53911 |
| φ | 0 | 0 | where, n represents the refractive index at a wavelength of 830 nm, δn represents the dispersion or the change of the refractive index per 1 nm at the wavelength 830 nm ($\times 10^{-5}$/nm), mag represents the beam magnification of each prism, θ represents the vertical angle (deg) of each prism, φ' represents the incident angle (deg) of the beam incident on each prism, and φ represents the exit angle of the beam emerging from each prism.

25. An optical disk apparatus comprising:

a light source for supplying a light beam;

an achromatic beam transformation optical system for expanding the width of said beam from said light source; and an objective lens for condensing said beam passed through said optical system onto an optical disk, said achromatic optical system having a chromatic aberration thereof compensated so as to compensate a vibration of a beam condensing position on said optical disk due to wavelength vibrations of said beam from said light source, said achromatic optical system including a first simplex prism made of a single material and arranged on the side of said light source and a second simplex prism made of a single, material and arranged on the side of said objective lens;

said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is substantially equal to that of said second prism, and that the beam incident angle of said first prism is substantially equal to the beam incident angle of said second prism, said first prism and said second prism being construted in such a manner that the refractive index of said first prism is substantially equal to that of said second prism, that the dispersion $\delta n_1$ of said first prism and the dispersion $\delta n_2$ of said second prism are selected to satisfy the expression $\delta n_1/\delta n_2 = m_1$, where $m_i$ represents a beam magnification of said first prism, and that the vertical angle of said first prism is substantially equal to that of said second prism, said beam exit surface of said first prism and said beam entrance surface of said second prism being inclined relative to each other, the beam exit angle of said first prism and the beam exit angle of said second prism being both selected to be zero degrees, and said first and second prisms being further constructed so as to satisfy a condition determined by the following equation $$0 \leq \frac{\left| \frac{\delta n_1}{\delta n_2} - m_2 \frac{\tan\theta_2}{\tan\theta_1} \right|}{\frac{\delta n_2}{\delta n_1} + m_2 \frac{\tan\theta_2}{\tan\theta_1}} < 0.15$$

where $n_1$=the refractive index of the first prism
$n_2$=the refractive index of the second prism
$\delta n_1$=the dispersion of the first prism
$\delta n_2$=the dispersion of the second prism
$\theta_1$=the vertical angle of the first prism
$\theta_2$=the vertical angle of the second prism
$m_2$=the magnification of the beam by the second prism.

26. An optical disk apparatus according to claim 25, wherein said first and second prisms are further constructed in accordance with the data stated as follows:

|  | first prism | second prism |
|---|---|---|
| n | 1.721700 | 1.722245 |
| $\delta n$ | 5.003 | 3.206 |
| mag | 1.5813 | 1.5809 |
| $\theta$ | 28.93087 | 28.91503 |
| $\phi'$ | 56.39565 | 56.37981 |
| $\phi$ | 0 | 0 | where, n represents the refractive index at a wavelength of 830 nm, $\delta n$ represents the dispersion or the change of the refractive index per 1 nm at the wavelength 830 nm ($\times 10^{-5}$/nm), mag represents the beam magnification of each prism,
$\theta$ represents the vertical angle (deg) of each prism,
$\phi'$ represents the incident angle (deg) of the beam incident on each prism, and $\phi$ represents the exit angle of the beam emerging from each prism.

27. An optical disk apparatus comprising:

a light source for supplying a light beam;

an achromatic beam transformation optical system for expanding the width of said beam from said light source; and an objective lens for condensing said beam passed through said optical system onto an optical disk, said achromatic optical system having a chromatic aberration thereof compensated so as to compensate a vibration of a beam condensing position on said optical disk due to wavelength vibrations of said beam from said light source, said achromatic optical system including a first simplex prism made of a single material and arranged on the side of said light source and a second simplex prism made of a single material and arranged on the side of said objective lens, said first prism being constructed in such a manner that an incident angle of said beam incident on said first prism from said light source is greater than an exit angle of said beam emerging from a beam exit surface of said first prism so as to expand the width of said beam passed through said first prism, said second prism being constructed in such a manner that an incident angle of said beam incident on a beam entrance surface of said second prism from said beam exit surface of said first prism is greater than an exit angle of said beam emerging from said second prism so as to expand the width of said beam passed through said second prism, said first prism and said second prism being different in dispersion from each other and being arranged apart from each other to form a space between said beam exit surface of said first prism and said beam entrance surface of said second prism, said first prism and said second prism being further arranged in such a manner that a beam magnification of said first prism is larger than that of said second prism, and that the beam incident angle of said first prism is greater than the beam incident angle of said second prism, said first prism and said second prism being construted in such a manner that the refractive index of said first prism is smaller than that of said second prism, that the dispersion $\delta n_1$ of said first prism and the dispersion $\delta n_2$ of said second prism are selected to satisfy the expression $\delta n_1/\delta n_2 =< 1$, and that the vertical angle of said first prism is greater than that of said second prism, said beam exit surface of said first prism and said beam entrance surface of said second prism being inclined relative to each other, the beam exit angle of said first prism and the beam exit angle of said second prism being both selected to be zero degrees, and said first and second prisms being further constructed so as to satisfy a condition determined by the following equation $$0 \leq \frac{\left| \dfrac{\delta n_1}{\delta n_2} - m_2 \dfrac{\tan\theta_2}{\tan\theta_1} \right|}{\dfrac{\delta n_2}{\delta n_1} + m_2 \dfrac{\tan\theta_2}{\tan\theta_1}} < 0.15$$

where $n_1$=the refractive index of the first prism
$n_2$ the refractive index of the second prism
$\delta n_1$=the dispersion of the first prism
$\delta n_2$=the dispersion of the second prism
$\theta_1$=the vertical angle of the first prism
$\theta_2$=the vertical angle of the second prism
$m_2$=the magnification of the beam by the second prism.

28. An optical disk apparatus according to claim 27, wherein said first and second prisms are further constructed in accordance with the data stated as follows:

|  | first prism | second prism |
|---|---|---|
| n | 1.510241 | 1.634291 |
| $\delta n$ | 1.936 | 3.753 |
| mag | 2.211 | 1.131 |
| $\theta$ | 38.24100 | 19.84525 |
| $\phi'$ | 69.19502 | 33.69767 |
| $\phi$ | 0 | 0 | where, n represents the refractive index at a wavelength of 830 nm, $\delta n$ represents the dispersion or the change of the refractive index per 1 nm at the wavelength 830 nm ($\times 10^{-5}$/nm), mag represents the beam magnification of each prism, $\theta$ represents the vertical angle (deg) of each prism, $\phi'$ represents the incident angle (deg) of the beam incident on each prism, and $\phi$ represents the exit angle of the beam emerging from each prism.

* * * * *